United States Patent
Kim

(10) Patent No.: US 8,895,205 B2
(45) Date of Patent: Nov. 25, 2014

(54) SOLID OXIDE FUEL CELL COMPRISING A COATED WIRE CURRENT COLLECTOR

(75) Inventor: Young-Kee Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 540 days.

(21) Appl. No.: 12/963,532

(22) Filed: Dec. 8, 2010

(65) Prior Publication Data

US 2011/0311902 A1    Dec. 22, 2011

(30) Foreign Application Priority Data

Jun. 17, 2010    (KR) .................. 10-2010-0057670

(51) Int. Cl.
- *H01M 8/02* (2006.01)
- *H01M 8/10* (2006.01)
- *H01M 8/12* (2006.01)

(52) U.S. Cl.
CPC .......... *H01M 8/0252* (2013.01); *H01M 8/0232* (2013.01); *H01M 8/0206* (2013.01); *H01M 2008/1293* (2013.01); *Y02E 60/50* (2013.01); *Y02E 60/525* (2013.01)
USPC .......................................... 429/522; 429/479

(58) Field of Classification Search
USPC ............... 429/9, 218.1, 218.2, 434, 490, 496, 429/522, 479; 427/115
See application file for complete search history.

(56) References Cited

U.S. PATENT DOCUMENTS

| | | | |
|---|---|---|---|
| 5,827,620 A * | 10/1998 | Kendall | 429/441 |
| 2004/0053109 A1 * | 3/2004 | Ovshinsky et al. | 429/40 |
| 2004/0142101 A1 * | 7/2004 | Eshraghi et al. | 427/115 |
| 2004/0166394 A1 * | 8/2004 | Sfeir et al. | 429/40 |
| 2005/0031911 A1 * | 2/2005 | Venkatesan et al. | 429/9 |
| 2005/0147857 A1 * | 7/2005 | Crumm et al. | 429/31 |
| 2008/0241605 A1 | 10/2008 | Crumm | |

FOREIGN PATENT DOCUMENTS

| | | |
|---|---|---|
| JP | 09-129250 | 5/1997 |
| JP | 10-106611 | 4/1998 |
| JP | 11-185780 | 7/1999 |

OTHER PUBLICATIONS

Machine Translation of: JP 09129250 A, Shigeisa et al., May 16, 1997.*
Machine Translation of: JP 11185780 A, Tateishi, Jul. 9, 1999.*
KIPO Notice of Allowance dated Sep. 20, 2012, for Korean priority Patent application 10-2010-0057670, (1 page).
KIPO Office Action dated Feb. 28, 2012 for KR 10-2010-0057670 (4 pages).

* cited by examiner

*Primary Examiner* — Kenneth Douyette
(74) *Attorney, Agent, or Firm* — Christie, Parker & Hale, LLP

(57) ABSTRACT

A solid oxide fuel cell (SOFC) of improved current collecting efficiency including, an anode, a cathode, an electrolytic layer between the anode and the cathode, and a current collector in an interior space defined by the anode and comprising a current collecting wire layer having a multiple-layered structure including a metal wire and a coating layer on an outer circumferential surface of the metal wire and having a higher melting point than that of the metal wire.

18 Claims, 4 Drawing Sheets

PRIOR ART

SOLID OXIDE FUEL CELL COMPRISING A COATED WIRE CURRENT COLLECTOR

CROSS REFERENCE TO RELATED APPLICATION

This application claims priority to and the benefit of Korean Patent Application No. 10-2010-0057670, filed on Jun. 17, 2010, in the Korean Intellectual Property Office, the entire content of which is incorporated herein by reference.

BACKGROUND

1. Field

Aspects of embodiments of the present invention relate to solid oxide fuel cells (SOFCs).

2. Description of Related Art

A fuel cell is a cell that converts chemical energy generated by oxidation into electric energy. Fuel cells are an eco-friendly technology that generate electric energy from materials such as oxygen and hydrogen, which are abundant on the Earth.

In fuel cells, an electrochemical reaction is performed as an inverse reaction of the electrolysis of water by respectively supplying oxygen and fuel gas to a cathode and an anode, respectively, thereby producing electricity, heat, and water. Therefore, fuel cells produce electricity at high efficiency while causing minimal pollution.

A process of producing electricity using fuel cells will be briefly described. Hydrogen is supplied to the anode, and the supplied hydrogen is decomposed into hydrogen ions and electrons. Then, the hydrogen ions are moved to the cathode through an electrolytic membrane, and the electrons are moved to the cathode through an external electrical wire, thereby generating electric power.

In fuel cells, a majority of the material discharged in the electricity generating process is only water. Hence, there is little to no concern about pollution, and energy generation efficiency is improved by about 40% or more when compared with existing electricity generation technologies. Since certain mechanically moving parts are not required, which are required in general heat engines, fuel cells have various advantages, such as miniaturization, less noise, etc.

Fuel cells are classified into alkaline fuel cells (AFCs), phosphoric acid fuel cells (PAFCs), molten carbonate fuel cells (MCFCs), polymer electrolyte membrane fuel cells (PEMFCs), and solid oxide fuel cells (SOFCs), as determined according to a kind of electrolyte used.

Among these types of fuel cells, SOFCs are widely used because the position of an electrolyte is easily controlled, there is no concern about the exhaustion of fuel, and the lifetime (lifespan) of a material (and therefore, the SOFC) is long.

SOFCs are generally classified as tube-types or plate-types according to a shape of a unit cell. In the case of general tube-type SOFCs, a material used as a current collecting wire has low electrical conductivity, but has a high increase in resistance under a high-temperature atmosphere (e.g., high temperature conditions). Therefore, the inherent properties of the material cause the current collecting efficiency to be substantially lowered, due to an increase in resistance and a decrease in conductivity of the current collecting wire in the process of collecting current. Moreover, when the entire volume, e.g., length, of each unit cell is enlarged to increase the electricity generation capacity of the SOFC, the current collecting wire is necessarily lengthened. Accordingly, the total resistance of the current collecting wire is also increased, and a voltage drop is increased at the same time. Therefore, degradation of performance results from voltage loss.

SUMMARY

An aspect of an embodiment of the present invention is directed toward a solid oxide fuel cell (SOFC) that is capable of enhancing the current collecting efficiency of its current collector. An aspect of an embodiment of the present invention, is directed toward a solid oxide fuel cell (SOFC) in which structure and material of a current collecting wire constituting a current collector of the SOFC are improved, thereby making it possible to prevent the current collecting wire from being disconnected in the process of driving the SOFC at a high temperature (e.g., due to a lower melting point of the material of the current collecting wire), and the structure and the material also causing the current collecting wire to have a lower resistance and higher conductivity than a general current collecting wire, thereby enhancing the entire current collecting efficiency of the SOFC.

In one embodiment of the present invention, there is provided an SOFC in which, despite an increase in the size of the SOFC, it is possible to prevent the resistance of each current collecting wire from being substantially increased, and to prevent current collecting efficiency from being substantially decreased due to power loss.

According to an aspect of embodiments of the present invention, there is provided an SOFC including an anode, a cathode, an electrolytic layer between the anode and the cathode, and a current collector in an interior space defined by the anode and including a current collecting wire layer having a multiple-layered structure including a metal wire and a coating layer on an outer circumferential surface of the metal wire and having a higher melting point than that of the metal wire.

According to another aspect of embodiments of the present invention, there is provided an SOFC including an anode, a cathode, an electrolytic layer between the anode and the cathode, and a current collector in an interior space defined by the anode and including a current collecting wire layer having a multiple-layered structure including a metal wire and a coating layer on an outer circumferential surface of the metal wire and having a melting point that is higher than a driving temperature of the SOFC.

The coating layer may include a metallic material having a melting point of 1000° C. or higher.

The coating layer may include a metallic material having a melting point of 1200° C. or higher.

The coating layer may include a metal selected from the group consisting of Ni, Cu, and W.

The coating layer may include a metal including a combination of two or more selected from the group consisting of Ni, Cu, and W.

The coating layer may include a plurality of coating sublayers.

The plurality of coating sublayers may include different materials.

The coating layer may have a thickness of at or between 2 and 3 μm.

The coating layer may include a plurality of separate portions intermittently located on the outer circumferential surface of the metal wire.

The coating layer may be placed on the outer circumferential surface of the metal wire using patterning, dipping, and/or deposition.

The metal wire may include a metal selected from the group consisting of Ag, Au, Al, Pt, and Cu.

The metal wire may include a metal including a combination of two or more selected from the group consisting of Ag, Au, Al, Pt, and Cu.

The metal wire may have an electrical conductivity that is higher than that of the coating layer.

The current collector may include a metal tube, the current collecting wire layer being on an outer circumferential surface of the metal tube, and a metal felt layer in a gap between the current collecting wire layer and an inner circumferential surface of the anode.

The metal tube may include a stainless steel-based material.

The metal wire may include a plurality of metal wires.

According to embodiments of the present invention, in an SOFC, a metal wire layer with high electrical conductivity is formed on an inner circumferential surface of a current collecting wire, and a coating layer with a high melting point is formed on an outer circumferential surface of the current collecting wire, thereby enhancing the entire current collecting efficiency of the SOFC.

Also, a high-melting-point coating layer is formed on the outer circumferential surface of a current collecting wire, making it possible to reduce the likelihood of disconnection and the like during the process of driving the SOFC at a high temperature, thereby enhancing the durability of the SOFC.

BRIEF DESCRIPTION OF THE DRAWINGS

The accompanying drawings, together with the specification, illustrate exemplary embodiments of the present invention, and, together with the description, serve to explain aspects of embodiments of the present invention.

DETAILED DESCRIPTION

Figure 1:
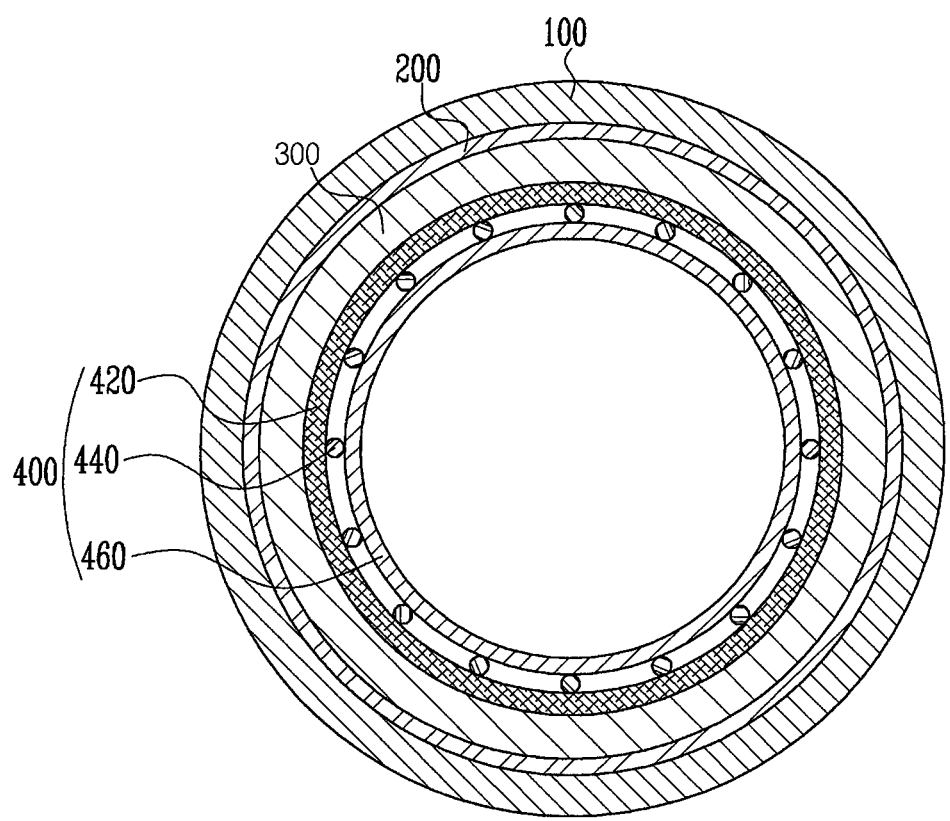
FIG. 1 is a front sectional view showing a structure of a unit cell and a shape of a current collecting wire in a general solid oxide fuel cell (SOFC).

In the following detailed description, only certain exemplary embodiments of the present invention have been shown and described, simply by way of illustration. As those skilled in the art will realize, the described embodiments may be modified in various different ways, all without departing from the spirit or scope of the present invention. Accordingly, the drawings and description are to be regarded as illustrative in nature, and not as restrictive. In addition, when an element is referred to as being "on" another element, it can be directly on the element or indirectly on the element with one or more intervening elements therebetween. Also, when an element is referred to as being "connected to" another element, it can be directly connected to the element or indirectly connected to the element with one or more intervening elements therebetween. Hereinafter, like reference numerals refer to like elements. In the drawings, the thickness or size of layers are exaggerated for clarity and are not necessarily drawn to scale.

As shown in FIG. 1, a general tube-type solid oxide fuel cell (SOFC) has a structure in which an electrolytic layer 200 and a cathode 100 are sequentially stacked on an outer circumferential surface of a cylindrical anode 300.

A current collector 400 for collecting current in an interior of each unit cell is formed on an inner circumferential surface of the anode 300. The current collector 400 is formed into a multiple-tube structure in which a metal felt layer 420 is adhered tightly to the inner circumferential surface of the anode 300, a current collecting wire layer 440 is formed on an inner circumferential surface of the metal felt layer 420 (e.g., the metal felt layer 420 is in a gap between the current collecting wire layer 440 and an inner circumferential surface of the anode 300), and a metal tube 460 that supports the metal felt layer 420 and the current collecting wire layer 440 is inserted into an interior of the current collecting wire layer 440.

Resistance in the current collector 400 is generated in the process of collecting current. Particularly, main resistance is determined by properties of one or more metal wires 442 (see FIG. 3) of the current collecting wire layer 440.

A Ni material having a high melting point may be used to form the metal wire 442 to prevent, or reduce the likelihood of, disconnection or the like in the process of driving the SOFC at a high temperature (e.g., about 600° C. to about 1000° C.).

However, Ni material has relatively low electrical conductivity, and also has increased resistance under a high-temperature atmosphere (e.g., high-temperature conditions).

Therefore, inherent properties of Ni material cause current collecting efficiency to be substantially lowered due to the increase in the resistance and the decrease in the conductivity of the metal wire 442 during the process of collecting current.

Moreover, in a case where the entire volume, e.g., length, of each unit cell is enlarged to increase the electricity generation capacity of the SOFC, the current collecting wire is necessarily lengthened. In this case, the resistance of the metal wire 442 is also increased as much as the length of the metal wire 442 is lengthened (e.g., the resistance of the metal wire 442 is proportionally related to its length), and therefore, a voltage drop is increased at the same time. As such, voltage loss occurs due to an increase in voltage drop, and consequently, the entire (e.g., overall) performance of the SOFC may be degraded.

That is, as Ni is a high-melting-point material conventionally used to solve the problem of disconnection of the metal wire 442, current collecting efficiency is unavoidably decreased due to the increase in resistance and the decrease in conductivity.

Ni material used as the metal wire may be replaced with an Ag material with low resistance. However, since Ag has a lower melting point than Ni, the metal wire formed with Ag is more likely to be disconnected in the process of driving the SOFC at a high temperature. Therefore, Ag material is rarely used as the metal wire.

Figure 2:
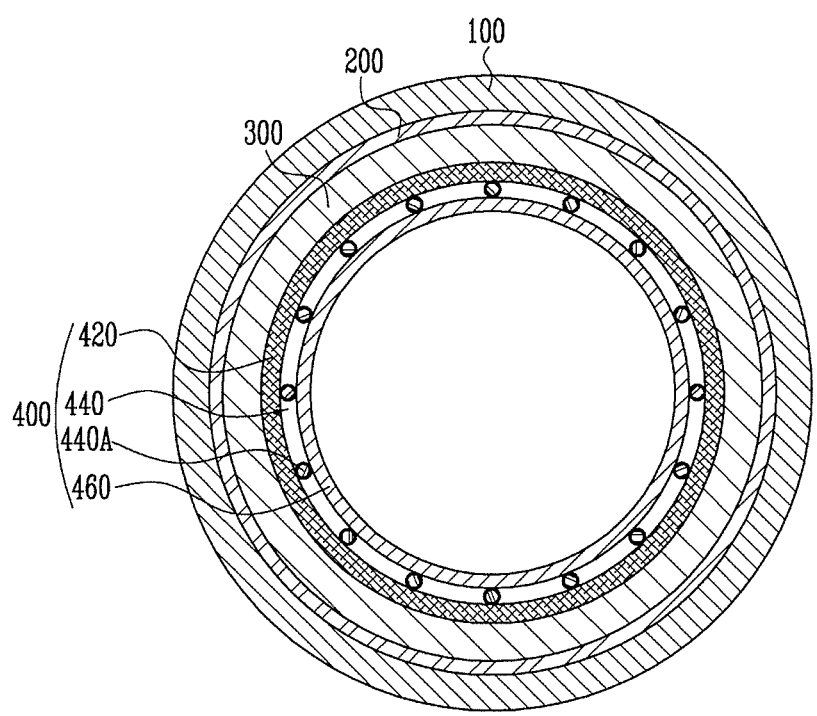
FIGS. 2 and 3 are front sectional views showing a structure of a unit cell and a shape of a current collecting wire and a coating layer in an SOFC according to an embodiment of the present invention.
Figure 3:
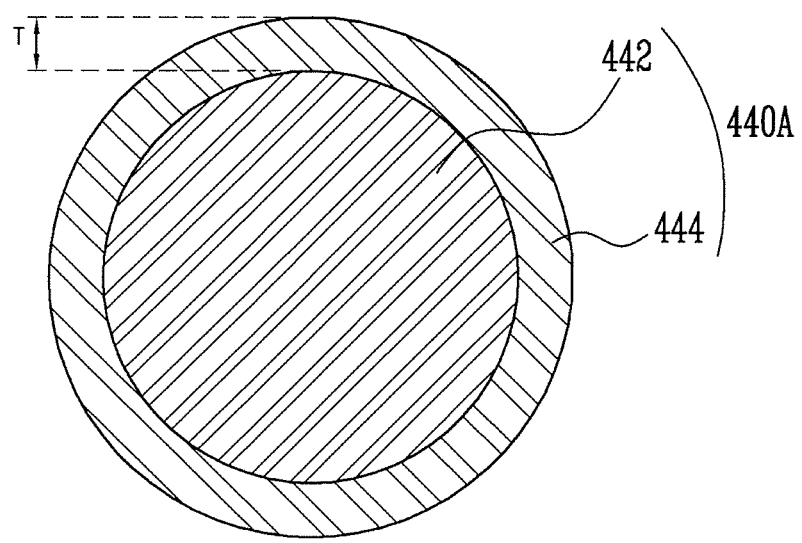

As shown in FIGS. 2 and 3, an SOFC according to an embodiment of the present invention is formed into a multiple-tube structure in which an electrolytic layer 200 and a cathode 100 are sequentially stacked on an outer circumferential surface of an anode 300, and a current collector 400 is inserted on an inner circumferential surface of the anode 300.

First, the cathode 100 is a portion to which oxygen ions are supplied, and to which hydrogen ions of hydrogen gas supplied to the anode 300 are finally moved. The cathode 100 is formed in the shape of a hollow tube having open ends.

The cathode 100 is formed of a pure electron conductor or a mixed conductor, such as a $LaMnO_3$-based or $LaCoO_3$-based material, which has high ion and electron conductivity, stability under an oxygen atmosphere, and no chemical reaction with the electrolytic layer 200, which will be described later.

The electrolytic layer 200 provided to the interior of the cathode 100 serves as a path along which oxygen ions produced through the cathode 100 and hydrogen ions produced through the anode 300 are moved. The electrolytic layer 200 is also formed in the shape of a hollow tube, and an outer circumferential surface of the electrolytic layer 200 is adhered tightly to an entire inner circumferential surface of the cathode 100.

The electrolytic layer 200 is made of a ceramic material having a degree of compactness so that gas does not penetrate the ceramic material. For example, an yttria stabilized zirconia (YSZ) obtained by adding a small amount of $Y_2O_3$ to $ZrO_2$ may be used as the electrolytic layer 200. Thus, the electrolytic layer 200 is formed into a structure having high ion conductivity under oxidation and reduction atmospheres, as well as having chemical and physical stability.

The anode 300 provided to the interior of the electrolytic layer 200 receives hydrogen gas that is the fuel of the SOFC. The anode 300 is formed in the shape of a hollow circular tube having open ends, and the outer circumferential surface of the anode 300 is adhered tightly to an entire inner circumferential surface of the electrolytic layer 200.

The anode 300 may be made of a ceramic material, such as YSZ.

Furthermore, a metal ceramic complex (cermet), such as NiO-YSZ or Ni-YSZ, may be used as the anode 300. Here, the metal ceramic complex (cermet) is relatively inexpensive, has stability under a high-temperature reduction atmosphere, and has a thermal expansion coefficient similar to the YSZ of the electrolytic layer 200.

The current collector 400 for collecting current in the interior of each unit cell is located on the inner circumferential surface of the anode 300. The current collector 400 is formed into a structure in which a metal felt layer 420, a current collecting wire layer 440, and a metal tube 460 are stacked.

The metal felt layer 420 is used to perform the conduction between the anode 300 and the metal tube 460 in the process of collecting current, and is also used to secure a sufficient contact area between the current collector 400 and the anode 300. The metal felt layer 420 of a flat plate made of a Ni material is adhered tightly to the entire inner circumferential surface of the anode 300. As a result, the metal felt layer 420 has the shape of a circular tube.

The metal felt layer 420 may be formed to come in direct contact with the inner circumferential surface of the anode 300. However, a separate metal paste may be coated on an outer circumferential surface of the metal felt layer 420 for the purpose of uniform contact between the metal felt layer 420 and the anode 300, so that the metal felt layer 420 comes in contact with the anode 300 through the metal paste.

The current collecting wire layer 440 in the interior of the metal felt layer 420 is used to support the metal felt layer 420 and to perform stable connection between the metal felt layer 420 and the metal tube 460, which will be described later. The current collecting wire layer 440 is formed into a structure in which current collecting wires made of a metallic material are arranged at intervals on the inner circumferential surface of the metal felt layer 420.

The metal tube 460 serves as a support that passes through a center of the SOFC. The metal tube 460 may be formed of a stainless steel-based material. Furthermore, the current collecting wire layer 440 may be on an outer circumferential surface of the metal tube 460.

FIG. 3 is an enlarged sectional view showing a current collecting wire 440A of the current collecting wire layer 440 of an embodiment of the present invention. In the described embodiment, the current collecting wire 440A is a concept included in the current collecting wire layer 440 shown in FIGS. 1 and 2. The current collecting wire 440A of FIG. 3 includes a metal wire 442 and a high-melting-point coating layer 444. The current collecting wire 440A may be formed into a multiple-layered structure in which the high-melting-point coating layer 444 is coated on an outer circumferential surface of the metal wire 442, and may include a plurality of separate portions intermittently located on the outer circumferential surface of the metal wire 442.

In the described embodiment, the metal wire 442 enhances conductivity and reduces resistance. The metal wire 442 may be made of a material such as Ag, Au, Al, Pt, or Cu, and the metal wire 442 may include a plurality of metal wires.

Each of these materials has a lower melting point than Ni, which is typically a material of the general current collecting wire. However, when compared to Ni, each of these materials has a lower increasing rate of resistance under a high-temperature atmosphere as well as remarkably higher electrical conductivity.

The metal wire 442 may be formed using only one of these materials, or may be formed using a compound and/or mixture obtained by combining two or more of these materials.

When a metallic material having low resistance and high conductivity is used as the material of the current collecting wire 440A, as described above, the current collecting wire 440A has a low increasing rate of resistance under high-temperature atmospheres, as well as enhanced conductivity, when compared to a general Ni-based current collecting wire. Thus, the entire current collecting efficiency of the current collecting wire 440A can be enhanced.

However, each of the aforementioned materials of the metal wire 442 has a lower melting point than Ni, as described above. Hence, when metal wires 442 of these materials are exposed (e.g., exposed to high temperatures), they may be disconnected.

In order to solve such a problem, a separate high-melting-point coating layer 444 is formed on the metal wire 442. The high-melting-point coating layer 444 prevents (or provides protection from) disconnection caused by a low melting point, which is a disadvantage of the metal wire 442. The high-melting-point coating layer 444 is formed into a structure in which it is coated on the entire outer circumferential surface of the metal wire 442. As such, the high-melting-point coating layer 444 is formed using a metallic material having a higher melting point than the metal wire 442, so as to cover the metal wire 442 of high electrical conductivity at a driving temperature of the SOFC. Thus, the low resistance and high electrical conductivity of the metal wire 442 can be sufficiently used.

Furthermore, the high-melting-point coating layer 444 may be intermittently formed on the outer circumferential surface of the metal wire 442.

The high-melting-point coating layer 444 may be made of a material such as Ni, Cu, or W. Each of these materials has a higher resistance and a lower electrical conductivity under a high-temperature atmosphere than the metal wire 442 formed with Ag, Au, Al, Pt, and/or Cu. However, each of the materials also has a remarkably higher melting point than that of the metal wire 442 formed with Ag, Au, Al, Pt, and/or Cu.

The high-melting-point coating layer 444 may be formed using only one of the materials, or may be formed using a compound obtained by combining two or more of the materials.

The high-melting-point coating layer 444 is not limited to Ni, Cu, and W. That is, materials having a melting point that is higher than the driving temperature of the SOFC may be selected as the high-melting-point coating layer 444.

In the case of the SOFC according to the described embodiment, a metallic material having a higher melting point than about 1000° C. may be used. For example, a metallic material having a melting point of about 1200° C. or higher is stable.

The high-melting-point coating layer 444 may be formed using various methods, such as patterning, dipping, and/or deposition, and the like.

In one embodiment of the present invention, the coating thickness T of the high-melting-point coating layer 444 is about 2 μm or thicker (for example, the high-melting-point coating layer 444 may have a thickness of at or between 2 and 3 μm). This is because the metal wire 442 performs a main function of collecting current, and the high-melting-point coating layer 444 serves as a cover for preventing, or reducing the likelihood of, the melting of the metal wire 442.

Therefore, when the high-melting-point coating layer 444 is extremely thick, the function of the metal wire 442 may not be properly performed.

Accordingly, in the described embodiment, the thickness of the high-melting-point coating layer 444, which can prevent the metal wire 442 from otherwise melting, is at or between 2 μm and 3 μm.

In the described embodiment, the SOFC has a structure in which the high-melting-point layer 444 surrounds the outer circumferential surface of the metal wire 442, so that although the SOFC is driven in a high-temperature atmosphere, it is possible to prevent the resistance of the current collecting wire 440A from being substantially increased due to the inherent properties of the metal wire 442. Also, the current collecting wire 440A has higher electrical conductivity than the general current collecting wire, and it is possible to overcome problems relating to durability of the metal wire 442, e.g., disconnection caused by a low melting point. Thus, when the size of the SOFC is enlarged to increase the electricity generation capacity of the SOFC, it is possible to prevent the resistance of the current collecting wire 440A from being substantially increased, and to prevent a voltage drop from being substantially increased. Accordingly, it is possible to prevent the performance of the SOFC from being substantially degraded due to power loss.

That is, the SOFC according to embodiments of the present invention includes a current collector 400 with a multiple-layered structure in which a high-melting-point coating layer 444 is formed on the outer circumferential surface of a metal wire 442 of high electrical conductivity, so that the various functions of different components of the SOFC can be properly performed at the same time. Accordingly, the current collector 400 can enhance current collecting efficiency as compared with a general Ni-based current collector.

Figure 4:
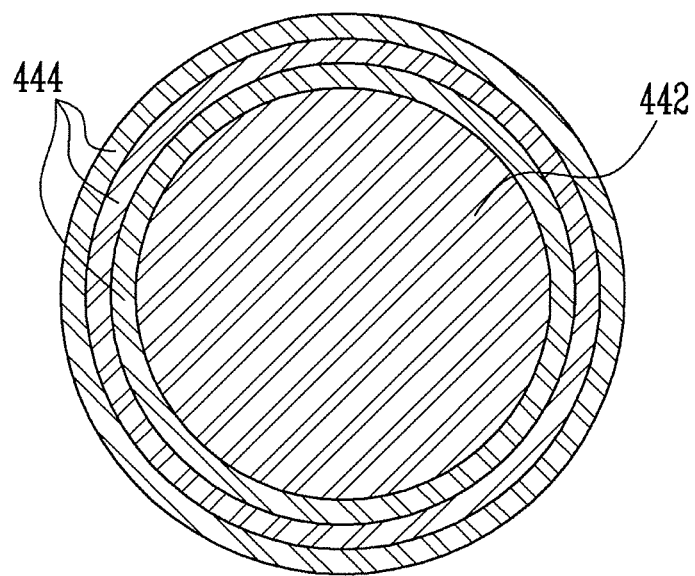
FIG. 4 is a front sectional view showing a current collecting wire and a coating layer of a multi-layered (e.g., multiple-layered) structure according to an embodiment of the present invention.

Moreover, as shown in FIG. 4, a plurality of high-melting-point coating layers 444 (e.g., high-melting-point coating sublayers 444) may be formed into a multiple-layered structure, and the respective high-melting-point coating layers 444 may be formed using different materials (e.g., the respective high-melting-point coating sublayers 444 may be each made of a different material, or a different combination of materials, than the other high-melting-point coating sublayers 444). When the respective high-melting-point coating layers 444 are formed using different materials, advantages and disadvantages among the materials can be complemented, thereby obtaining higher efficiency.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A solid oxide fuel cell (SOFC), comprising:
an anode;
a cathode;
an electrolytic layer between the anode and the cathode; and
a current collector in an interior space defined by the anode and comprising a current collecting wire layer having a multiple-layered structure comprising:
a plurality of metal wires each extending in an axial direction of the SOFC; and
a coating layer on an outer circumferential surface of each of the metal wires, having a higher melting point than that of the metal wires, and comprising a plurality of separate portions intermittently located on the outer circumferential surface of each of the metal wires,
wherein the current collector comprises:
a metal tube;
the current collecting wire layer being on an outer circumferential surface of the metal tube; and
a metal felt layer in a gap between the current collecting wire layer and an inner circumferential surface of the anode.

2. The SOFC according to claim 1, wherein the coating layer comprises a metallic material having a melting point of 1000° C. or higher.

3. The SOFC according to claim 1, wherein the coating layer comprises a metal selected from the group consisting of Ni, Cu, and W.

4. The SOFC according to claim 1, wherein the coating layer comprises a metal comprising a combination of two or more selected from the group consisting of Ni, Cu, and W.

5. The SOFC according to claim 1, wherein the coating layer comprises a plurality of coating sublayers.

6. The SOFC according to claim 5, wherein the plurality of coating sublayers comprise different materials.

7. The SOFC according to claim 1, wherein the coating layer has a thickness of at or between 2 and 3μm.

8. The SOFC according to claim 1, wherein the metal wires, comprise a metal selected from the group consisting of Ag, Au, Al, Pt, and Cu.

9. The SOFC according to claim 1, wherein the metal wires comprise a metal comprising a combination of two or more selected from the group consisting of Ag, Au, Al, Pt, and Cu.

10. The SOFC according to claim 1, wherein the metal wires have an electrical conductivity that is higher than that of the coating layer.

11. A solid oxide fuel cell (SOFC) comprising:
an anode;
a cathode;
an electrolytic layer between the anode and the cathode; and
a current collector in an interior space defined by the anode and comprising a current collecting wire layer having a multiple-layered structure comprising:
a plurality of metal wires each extending in an axial direction of the SOFC; and
a coating layer on an outer circumferential surface of each of the metal wires, having a melting point that is higher than a driving temperature of the SOFC, and comprising a plurality of separate portions intermittently located on the outer circumferential surface of the metal wires, wherein the current collector comprises:
- a metal tube;
- the current collecting wire layer being on an outer circumferential surface of the metal tube, and
- a metal felt layer in a gap between the current collecting wire layer and an inner circumferential surface of the anode.

12. The SOFC according to claim 11, wherein the coating layer comprises a metallic material having a melting point of 1000° C. or higher.

13. The SOFC according to claim 11, wherein the coating layer comprises a metal selected from the group consisting of Ni, Cu, and W.

14. The SOFC according to claim 11, wherein the coating layer comprises a metal comprising a combination of two or more selected from the group consisting of Ni, Cu, and W.

15. The SOFC according to claim 11, wherein the coating layer comprises a plurality of coating sublayers.

16. The SOFC according to claim 11, wherein the metal wires comprise a metal selected from the group consisting of Ag, Au, Al, Pt, and Cu.

17. The SOFC according to claim 11, wherein the metal wires comprise a metal comprising a combination of two or more selected from the group consisting of Ag, Au, Al, Pt, and Cu.

18. The SOFC according to claim 11, wherein the metal wires have an electrical conductivity that is higher than that of the coating layer.

* * * * *